No. 804,507. PATENTED NOV. 14, 1905.
J. R. SNELL.
MACHINE FOR TRANSFERRING AND TURNING LOGS IN SAWMILLS.
APPLICATION FILED JULY 20, 1905.
2 SHEETS—SHEET 2.
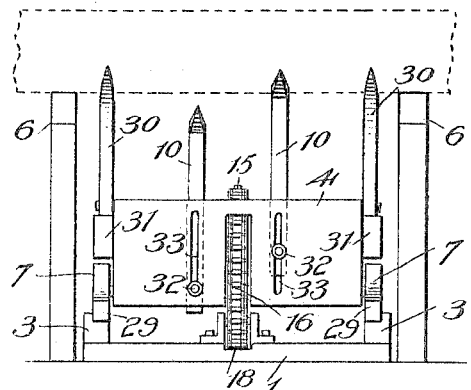
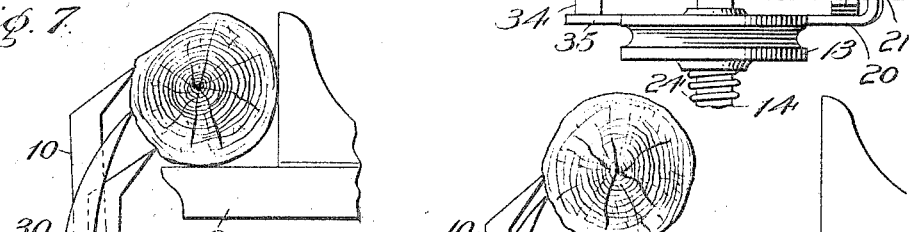
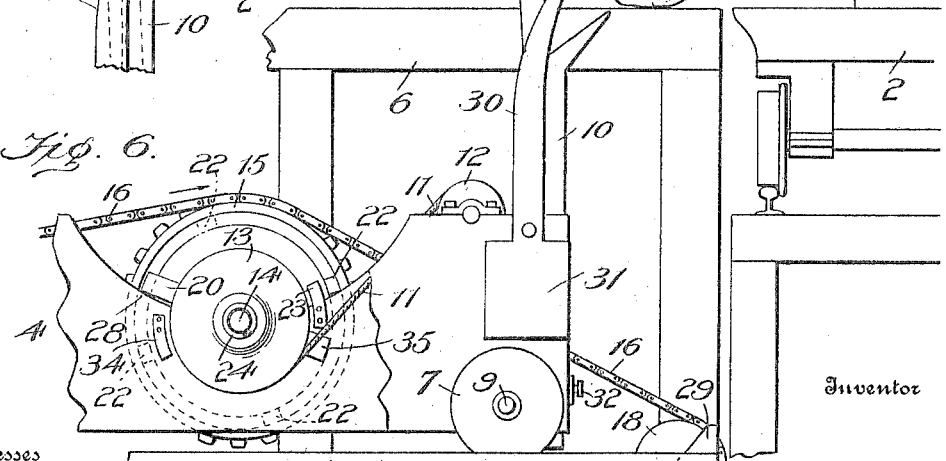
Witnesses
Edwin L. Bradford
Anna B. Johnson
Inventor
John R. Snell
By Johnson & Johnson
Attorneys

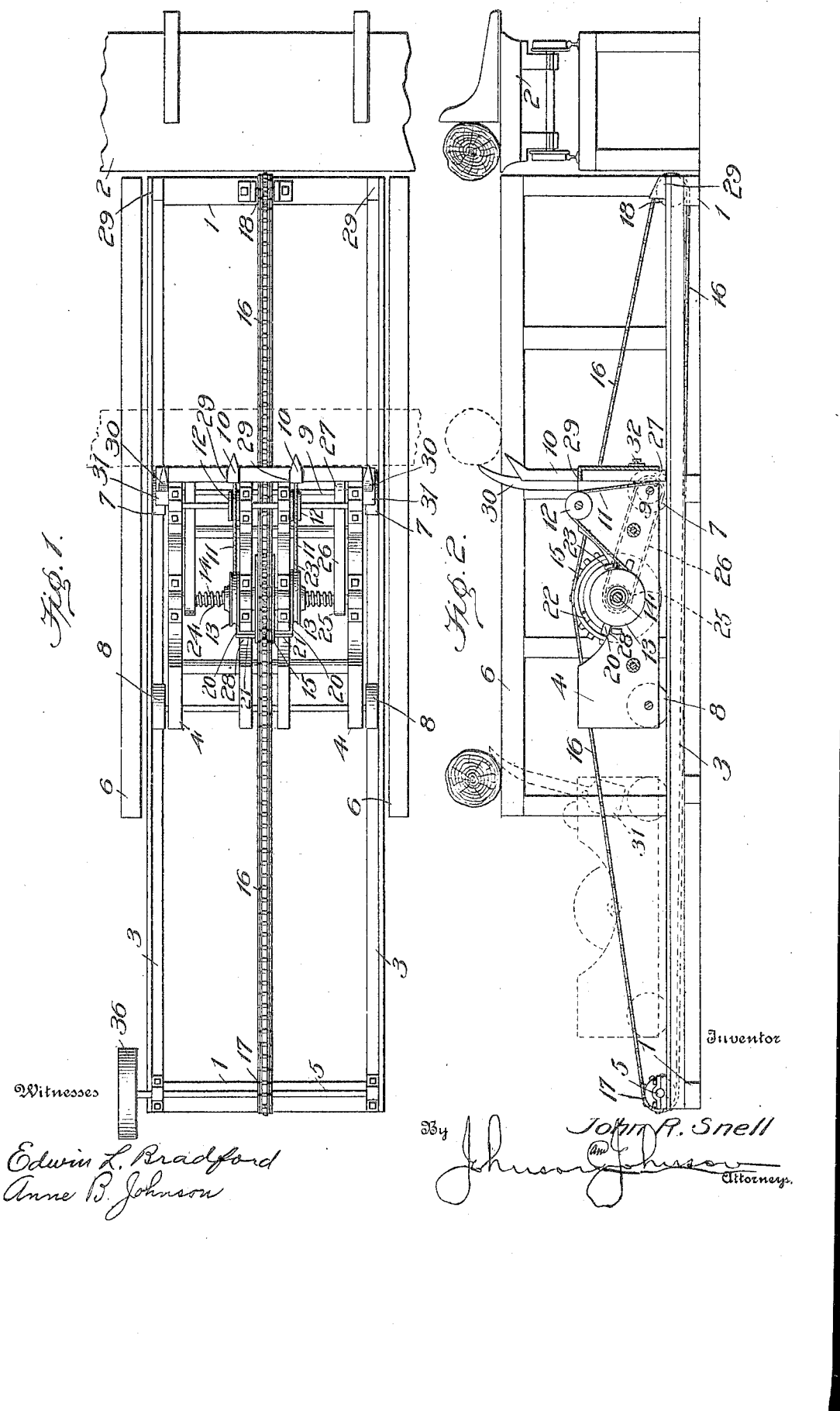

UNITED STATES PATENT OFFICE.

JOHN RANDOLPH SNELL, OF TALLAPOOSA, GEORGIA, ASSIGNOR OF ONE-HALF TO HENRY JACKSON WESTBERRY, OF ODUM, GEORGIA.

MACHINE FOR TRANSFERRING AND TURNING LOGS IN SAWMILLS.

No. 804,507.     Specification of Letters Patent.     Patented Nov. 14, 1905.

Application filed July 20, 1905. Serial No. 270,525.

*To all whom it may concern:*

Be it known that I, JOHN RANDOLPH SNELL, a citizen of the United States, residing at Tallapoosa, in the county of Harralson and State of Georgia, have invented certain new and useful Improvements in Machines for Transferring and Turning Logs in Sawmills; and I do hereby declare the following to be a full, clear, and exact description of the invention, such as will enable others skilled in the art to which it appertains to make and use the same.

For rolling logs upon sawmill-carriages and for turning them thereon to square them preparatory to sawing the log into boards my invention is directed to the production of a combined carriage and rolling device, whereby the logs are automatically transferred from an elevated fixed skidway upon the mill-carriage and in which the movements of the carriage and of the rolling devices are effected from the same power-driven shaft, and in the claims appended hereto I will point out the parts and combinations of parts which constitute my invention.

The following description, read in connection with the accompanying drawings, will enable any person skilled in the art to which my invention relates to understand its nature and to practice it; but it will be understood that my invention is not limited to the precise construction and details illustrated and described, as various modifications and changes may be made without exceeding the scope of the claims in which my invention is set out.

Referring to the drawings, Figure 1 shows in top view my machine for transferring logs from an elevated skidway and turning them in sawmills. Fig. 2 is a longitudinal section of the same, showing the relation of the transferring-carriage and its lifting and rolling toothed bars to the elevated skidway. Fig. 3 is a front view of the same. Fig. 4 is an enlarged detail in top view, showing one of the trip devices in the position it is tripped as the carriage moves forward to let one of the toothed bars fall. Fig. 5 is an identical view showing the same trip device out of action, so that only one of the trip devices and one of the toothed bars will be operative when desired. Fig. 6 is an enlarged elevation showing the relation of the transferring-carriage and its toothed bars to the elevated skidway and to the mill-carriage. Fig. 7 shows the log as having been transferred from the skidway to the mill-carriage and the relation of the log to the turning and check bars in turning the log to square it. Fig. 8 shows in detail one of the arms of the trip device in the position when put out of the plane of action of the projection 22 of the sprocket-wheel by a removable wedge 33 when only one trip device is used, as in Fig. 5. Fig. 9 shows in detail the arm of the trip device as having engaged a fixed wedge 23 to trip a toothed bar, as in Fig. 4, to let the bar fall.

A foundation-frame 1 has a fixed relation to and stands at right angles to the travel of the carriage 2, on which the log is dogged to be sawed into boards. This frame is constructed with ways 3 3, on which is mounted a carriage 4, which carries the devices for transferring the log onto the mill-carriage and turns or rolls the log upon said carriage in the operation of squaring the log preparatory to sawing it into boards. For this purpose the fixed frame has a length for a mill of ordinary size of about forty feet and a width of about eight or ten feet and at its outer end has a suitably-mounted transverse power-driven shaft 5, from which the power is transmitted for causing the carriage to be moved forward upon its ways to transfer the log from a fixed elevated skidway 6 upon the mill-carriage. The transferring-carriage therefore travels between the fixed elevated skidway. The elevated skidway for this purpose has a length about ten feet less than that of the foundation-frame in order to allow the front end of the transferring-carriage to be moved back to the rear end of the elevated skidway to allow the carriage in its forward movement to cause the log to be rolled the full length of the skidway, from the front end of which the log is transferred to the mill-carriage. The skidway is constructed of studs and top beams suitably braced to allow the means for rolling the logs upon it to work vertically between the top beams with the movement of the carriage, as I will more particularly hereinafter state.

The transferring-carriage frame is of suitable braced construction and mounted upon a pair of rolls 7 at the front and a pair of rolls 8 at its rear ends, the front rolls 7 being fixed upon the ends of a transverse shaft 9, which is driven from the power-driven shaft. A novel feature of my invention is the provision on the carriage itself of means for rolling the logs upon the elevated skidway, operated as the carriage is moved forward to the limit of its movement, then transferring the log upon the mill-carriage and turning it thereon in the operation of squaring it, and which I will now describe. At the front end of the carriage are mounted a pair of bars 10, each of which terminates in a forward-projecting spear-point, adapted in its upward and forward movements to engage and roll the log resting on the skidway. These vertical bars are about the middle of the width of the carriage, and a cable 11, passing over a pulley 12, connects the lower end of each bar to a trip device, whereby the bar is raised to engage and to roll the log and then tripped to allow it to fall by its weight. I use a trip device 13 for each toothed bar and operate them so that the bars will rise and fall alternately as the carriage moves forward. These trip devices are mounted upon a transverse shaft 14 about mediately of the length of the carriage and are actuated from the power-driven shaft by sprocket-gear connections arranged between the trip devices and adapted to give a quick vertical action to each bar. For this purpose the said mediate shaft has fixed thereon a sprocket-wheel 15, about two feet in diameter, a sprocket-chain 16, from which wheel passes around a sprocket-wheel 17, of about nine inches in diameter on the power-driven shaft, the other end of said chain passing around a plane roll 18, of the same diameter at the front end of the foundation-frame, so that it will be seen that the small driven sprocket-wheel will give a rapid rotation to the large wheel, flanking and operated by which are the trip devices. Each trip device consists of a pulley 13, loosely mounted on the mediate shaft, and around each pulley passes a bar-connected rope 11, the end of which, being fastened to said pulley, is wound thereon in lifting the toothed bar. This pulley is caused to have a trip function to allow said bar to fall, and for effecting this lifting and tripping function I have provided a simple durable means, consisting of an arm 20, fastened to and standing radially from each pulley and terminating in a right angle, forming a dog 21, adapted to engage a shoulder or projection 22 on the vertical wall of the large sprocket-wheel, so that the rotation of the latter will cause the rotation of the trip-pulley, thereby winding the cable and quickly lifting the bar. This lifting of each bar will occupy, say, half the circumference in the rotation of the sprocket-wheel, at which point the arm of the trip will strike a detent 23 on the carriage-frame and by a wedge action of said detent on the arm cause it and its pulley to be moved away from the wall of the sprocket-wheel, as in Figs. 5 and 9, and thereby release the engagement of the trip-arm, leaving the toothed bar free to fall and with it turning the pulley in the opposite direction, bringing its trip-arm at once in position to engage a like shoulder on the same side of the sprocket-wheel, and for this purpose the pulley is constantly pressed toward the sprocket-wheel by a coil-spring 24 on the shaft. While, therefore, the rotation of the sprocket-wheel is always in the same direction in moving the carriage forward, the pulley-trip device is caused to have a semirotation in opposite directions to effect the lifting and falling of the toothed bars in their engagement with the log. While the sprocket-gear actuates the trip devices to lift the log-engaging bars alternately, as stated, the same sprocket connections are caused to move the carriage forward to roll the log on the elevated skidway by means of a pulley 25 on the mediate shaft and a belt 26, leading from said pulley to a pulley 27 on the shaft of the front carriage-supporting wheels. If found necessary, there may be such a belt connection for each end of the front carriage-shaft.

It will be understood that the forward movement of the carriage effects the movement of the sprocket-wheel and the positive engagement of the trip devices with the shoulders 22 of the sprocket-wheel; but on the backward movement of the carriage the trip-arms will turn back with the reverse movement of the sprocket-wheel and engage the carriage-frame at 28, Figs. 4 and 6, and thereby the trip-arm is held from further backward movement by reason of the inclined faces of the said shoulders 22 passing without engaging the trip-arms, so that in the backward movements of the carriage there will be no lifting movement of the bars.

The toothed bars are supported in guideways 29 to maintain their positions to engage and to turn or to roll the log, and, looking at Figs. 6 and 7, it will be seen that in their normal or lowest positions their upper spear-pointed ends will be below the plane of the lowest side of the log as it rests upon the skidway or carriage, and in the latter position the head-block forms an abutment against which the log is turned in the operation of squaring it, and this will cause the end of the bar in engagement with the log to move slightly backward on its lower end as a pivot in a path corresponding with the turning of the log, and to permit of this slight curved movement of the engaged end of the bar the rear side of its guideway is open, as in Fig. 1; but the connection of the cable with the lower end of the bar is such as to support and pull upon and keep the bar normally vertically within its guide, so that in being lifted the spear-point will engage the log, as in Fig. 2. The log having been transferred from the elevated skidway to the carriage, the lifting-bars are only actuated to turn the log to square it before sawing it into boards, as in Fig. 7; but in rolling the logs forward on the skidway to the mill-carriage for the sawing operation, as in Fig. 6, the engaging points of the lifting-bars will, in their working positions, be just below the top plane of the skidway and in their upward movements roll the log forward by the same movement the carriage is moved forward and to the same extent, the fixed foundation-frame being provided with stops 29 to limit such movement of the carriage. When the carriage has reached this limit, its front supporting-wheels will cease to revolve and the log will at this point be transferred upon the mill-carriage, but the power-driven shaft continuing will, by its sprocket-chain connections, continue to actuate the lifting-bars by their trip-connecting devices until the log has been squared and sawed. In this squaring operation the carriage has no movement, and its front wheels being checked by the frame-stops the belt or belts connecting the mediate sprocket-wheel shaft with the pulley 27 on the front shaft 9 will slip on the pulley 25 or pulleys of the sprocket-wheel shaft, and by this means the sprocket-chain connections are rendered effective to actuate the lifting-bars without moving the carriage. For controlling the movements of the power-driven shaft obviously it may be provided with any suitable clutch connections by which the carriage is advanced and reversed in its movements, which it is deemed unnecessary to show and which may be effected through the power-driven pulley 36. The momentum caused by transferring the log from the elevated skidway upon the mill-carriage would tend to cause the log to have a slight return movement away from the head-block, and to prevent this I provide the carriage in alinement with the lifting-bars with self-balanced check-bars 30, pivotally mounted at each side of the carriage and having their upper ends terminating in a forward standing curved point and adapted to engage the side of the log and hold it against the head-block. This engagement is rendered automatic by the tendency of the lower weighted end 31 of the check-bar to cause its pointed end to stand slightly under the log, so that its tendency to roll forward will cause the check-bar to dig slightly into the log, and this checking takes place every time the log is turned or rolled either upon the skidway or upon the carriage. The shoulders 22 on the sprocket-wheel are so disposed as to cause one lifting-bar to be tripped to allow it to fall away from its engagement with the log at the moment the other trip device is caused to be actuated to lift the other bar, and to maintain the bars in their vertical working positions their lower ends are provided with pins 32, working in slots 33 in the front of the carriage.

I prefer to make the trip-arm of a steel plate of sufficient strength to support the lifting-bar under a force sufficient to effect the rolling and turning of the log and sustain the weight of the bar.

Referring to the tripping-pulley devices, it is important to note that they are each loosely revoluble upon the same shaft, that they are each revoluble on the shaft forward and backward, that they are each limited in their forward and backward movements, that each has a free coöperative relation to and is actuated by a separable engagement with the opposite sides of a single wheel, and that each trip device is adapted for automatic engagement and disengagement with and from a single driven wheel.

As the beams of the elevated skidway are outside of and along the sides of the foundation-frame and the carriage moving beneath them, the log-turning bars and the check-bars will engage the logs between the skidways and roll them thereon to the mill-carriage and transfer the logs thereon, and as the carriage is stationary at this transfer-point the operation of the lifting and check bars is continued to turn the log as often as required to square it.

The importance of having the trip devices independent of each other is seen in the advantage of putting one trip device out of action, as in Figs. 5 and 8, while the other is operating, as may be desirable in case the logs should be placed or become oblique on the skidways, which would interfere with its true rolling and being placed properly on the carriage. By operating either one of the lifting-bars the oblique positions of the logs could be corrected, and this by simply driving a wedge or stick 33', Figs. 5 and 8, between the spring trip-arm and the carriage-frame, so as to press and to hold the trip-arm out of the plane of the rotation of the shoulder of the sprocket-wheel, so that the latter could rotate without engaging the cut-out trip-arm.

The advantage of the carriage is that it can be moved at any point on the foundation-frame to place its lifting-bars at the point where the hook ends of the bars will on being lifted engage the log wherever it may be placed on the skidway and cause it to be rolled from that point on the skid to the front of the carriage and over the lifting ends of the bars upon the mill-carriage, the transferring-carriage being then maintained stationary at that point to operate the lifting-bars to turn the log as it may be necessary to square it. But it is in the movement of the carriage when the lifting-bars are engaged with the log that gives the important advantage of supplementing the lifting action of the toothed bars by forcing or pushing the log in rolling it by the positive moving force of the carriage, so that the log is rolled by the combined lifting force of the toothed bars and the pushing force of the carriage, both forces being rendered simultaneously operative by the power which operates the carriage.

After a log has been transferred from the skidway and squared the carriage is then moved back to its starting-point to engage and roll another log, which is placed upon the skidway in front of the toothed bars. The placing of the skid-beams on each side of the carriage is to support and balance the log over the carriage, and thus allow the toothed bars to engage the log above the carriage and between the skid-beams, and for this purpose a pair of skid-beams may be used on each side of the carriage. As the work of the toothed bars required continuous movements, I provide for giving them quick movements with a comparative slow movement of the transferring-carriage, thus giving two trip movements to each of the lifting-bars to one revolution of the sprocket-wheel. In explanation of this it will be seen that a comparatively continuous application of power to the toothed bars results from the fact that upon the disconnection of the pulleys 13 from the sprocket-wheel 15 the weight of the pusher-bar immediately returns the pulley 13 for reëngagment with the pulley before the other pulley 13 has become disengaged, so that both toothed bars are engaged during the most of the time, while only one bar is ever disengaged at any one time, the comparatively slow movement of the winding action of the pulleys 13 giving time for the pulley which has been disengaged to return for a new engagement before the other pulley is disengaged.

I have described the fixed wedge 23 for pressing the rigid trip-arm 20 out of engagement with the sprocket-wheel projection 22 to effect the trip of the toothed bar, and to relieve the unequal side strain that would by such engagement of the arm be thereby put upon the pulley in forcing it back against the spring 24 a wedge 34 is secured on the frame 4 diametrically opposite to the wedge 23, and an arm 35 on the trip-pulley engages said wedge 34 at the same time the trip-arm 20 engages the wedge 23, as in Fig. 4, thus moving the trip-pulley against its spring without side strain or binding on its shaft.

I claim—

1. In a machine for transferring and turning logs and in combination with the mill-carriage, a transferring-carriage mounted to travel toward and from the side of the mill-carriage, a pair of toothed bars vertically mounted on said carriage, skidways above said carriage, means for operating the carriage, means carried by the carriage and operating simultaneously with the advance movement of the carriage for lifting the toothed bars to roll and transfer the log, and means for tripping the toothed bars, the log being caused to be rolled forward on the skid and transferred therefrom upon the mill-carriage by the coöperating pushing force of the carriage and the lifting action of the toothed bars.

2. In combination with the mill-carriage and skidways, a transferring-carriage beneath the skidway, a pair of toothed bars vertically mounted on said transferring-carriage and adapted to engage the log between the skidway-beams, and means mounted on the carriage whereby it is reciprocated and by which the toothed bars are lifted to engage the log during the advance movement of the carriage, and means operated by the advance movement of the carriage for tripping the toothed bars.

3. In a machine for transferring and turning logs and in combination with the mill-carriage, a transferring-carriage, a pair of toothed bars mounted on said transferring-carriage, skidways above and on each side of said transferring-carriage, a shaft transversely mounted on said transferring-carriage a sprocket-wheel fixed on said shaft and a pair of projections on each side of said wheel, power-driven connections for operating said sprocket-wheel, a pulley loosely mounted on said shaft on each side of said sprocket-wheel, an arm on each of said pulleys adapted to successively engage the sprocket-wheel projections, a cable connecting each pulley with the lower end of each toothed bar to successively lift them, and a fixed wedge adapted to engage and trip said arm from its engagement with the sprocket-wheel projections on the advance of the transferring-carriage.

4. In a machine for transferring and turning logs and in combination with the mill-carriage, a foundation-frame, a transferring-carriage having supporting-rolls on said frame, a pair of toothed bars mounted on said transferring-carriage, skidways above and on each side of said transferring-carriage, a shaft transversely mounted on said transferring-carriage, a sprocket-wheel fixed on said shaft and having a pair of projections on each side, a power-driven shaft on one end of the foundation-frame, a sprocket-pulley on said shaft, a pulley on the other end of the foundation-frame, a sprocket-chain connecting the pulleys and the sprocket-wheel whereby to operate said sprocket-wheel, means mounted on said shaft and actuated by said sprocket-wheel for connecting and lifting said toothed bars, means connecting said sprocket-wheel shaft with the carriage-wheels to reciprocate the carriage, and means for tripping the toothed bars.

5. In a machine for transferring and turning logs, a transferring-carriage, a skidway above and on each side of said carriage, toothed bars mounted on the front of said carriage, means for reciprocating said carriage, and means operated by the means which operates the carriage for causing said toothed bars to be lifted in the operation of rolling and transferring the log from said skidway.

6. In a machine for transferring and turning logs, a foundation-frame, a power-driven shaft thereon having a sprocket-pulley, a carriage having mounting-rolls on said frame, fixed skidways above and on each side of said carriage, toothed bars mounted on said carriage, a transverse shaft mounted on the latter, a sprocket-wheel fixed on said shaft, a pulley loosely mounted thereon at each side of said sprocket-wheel, a cable secured to and passing around said pulley and connected to the lower end of said toothed bar, a spring trip-arm on said pulley adapted to engage the projections of said wheel in its rotation, and a fixed wedge adapted to engage the said pulley-arm on its forward movement to cause said pulley to be tripped to allow the toothed bar to fall, and a sprocket-chain engaging the pulley on the power-driven shaft and a pulley fixed on said frame for operating said sprocket-wheel, and connections for transferring the power of said wheel to the carriage-rolls to reciprocate it.

7. In a machine for transferring and turning logs, a foundation-frame, a carriage having mounting-rolls on said frame, skidways above and on each side of said carriage, toothed bars mounted on the front of said carriage, a transverse shaft mounted mediately of the latter, a sprocket-wheel fixed mediately of said shaft, a cable connected to the lower end of the toothed bar, a trip device on said shaft connected to said cable, means carried by the sprocket-wheel for operating said trip device, means for rotating the sprocket-wheel, a pulley fixed on said sprocket-wheel shaft, and a belt leading therefrom for rotating the carriage-rolls, whereby the said sprocket-wheel is caused to operate the toothed bars and the carriage simultaneously to effect the rolling and transfer of the log from the skidway.

8. In a machine for transferring and turning logs, a transferring-carriage, a pair of toothed bars mounted on the front of said carriage, skidways above and on each side of said carriage, a pair of self-acting check-bars pivotally mounted on said carriage, in alinement with the toothed bars, means for operating the carriage, means carried by the carriage and operating simultaneously with the advance movement of the carriage for lifting the toothed bars to roll and transfer the log, and means for tripping the toothed bars.

9. In a machine for transferring and rolling logs, and in combination with the mill-carriage, a transferring-carriage, having the following elements, a pair of vertical toothed bars, means for lifting them, means for tripping them, and means for operating the carriage, and skidways above and on each side of the transferring-carriage, the toothed ends of the said lifting-bars operating to engage the log from the under side of the skidway and the forward movement of the carriage thereon being simultaneous with the lifting action of the toothed bars.

10. In a machine for transferring and turning logs and in combination with the mill-carriage, a transferring-carriage, a pair of toothed bars mounted on said carriage, and a skidway above said carriage, means for operating said carriage, an independent operating device for each toothed bar consisting of a shaft mounted in said carriage, a power-driven wheel on said shaft, a pulley loose on said shaft on each side of said power-driven wheel and revoluble forward and backward within limits, means carried by each pulley for separable engagement with the opposite sides of said power-driven wheel, and means for automatically engaging and disengaging each trip device with and from said power-driven wheel.

11. In a machine for transferring and turning logs and in combination with a skidway, a transferring-carriage beneath and between the skidways, a pair of toothed bars mounted on said carriage, a shaft mounted transversely on said carriage, a pair of pulleys each loosely mounted on said shaft, a power-driven wheel fixed on said shaft between said pulleys, a spring for each pulley constantly pressing it toward said power-driven wheel, a cable connecting each pulley with a toothed bar to lift it, means for each pulley on the opposite sides of the power-driven wheel whereby to automatically lift and trip each toothed bar, and means operated by said shaft for reciprocating each carriage.

12. In a machine for transferring and turning logs, a skidway, a transferring-carriage beneath the skidway, means operatively mounted upon the carriage for engaging and rolling the log upon and from the skidway, and means for advancing the carriage, the operation of the separate means coöperating to continuously roll the log upon and transfer it from the skidways.

13. In a machine for transferring and turning logs, a pair of separated skidways, a transferring-carriage below and between the skidways, a pair of toothed bars mounted on the carriage below and between the skidways, means for lifting the toothed bars above the skidways in engagement with the log thereon, means for tripping the toothed bars, and means for moving the carriage forward simultaneously with the lifting movements of the toothed bars, whereby the log is rolled upon the skidways and transferred therefrom.

14. In a machine for transferring and turning logs and in combination with skidways, a transferring-carriage, a pair of toothed bars mounted on said carriage, a shaft mounted transversely on said carriage, a sprocket-wheel fixed on said shaft and having a pair of projections on each side, power-driven connections for operating said sprocket-wheel, a pulley loosely mounted on said shaft on each side of said wheel each pulley having a trip-arm adapted to successively engage the sprocket-wheel projections, a cable connecting the pulley with the lower end of each toothed bar to successively lift them, a fixed wedge adapted to engage and trip said arm from its engagement with the sprocket-wheel projections on the advance of the transferring-carriage, and means whereby the trip-arm of one of said pulleys may be moved away from the sprocket-wheel to carry the trip-arm out of the plane of action of the said wheel projections to render one of said toothed bars inoperative.

In testimony whereof I have signed my name to this specification in the presence of two subscribing witnesses.

JOHN RANDOLPH SNELL.

Witnesses:
E. F. VERY,
A. V. HOWE.